(12) United States Patent
Ryang et al.

(10) Patent No.: US 6,365,093 B1
(45) Date of Patent: Apr. 2, 2002

(54) STRENGTHENING METHOD FOR GREEN FORM PARTS MADE FROM METAL POWDER

(75) Inventors: Hong-Son Ryang, Camarillo; Scott A. Schroeder, Newbury Park, both of CA (US)

(73) Assignee: Rockwell Technologies, LLC, Thousand Oaks, CA (US)

( * ) Notice: Subject to any disclaimer, the term of this patent is extended or adjusted under 35 U.S.C. 154(b) by 0 days.

(21) Appl. No.: 09/597,509

(22) Filed: Jun. 20, 2000

(51) Int. Cl.[7] .................................................. B22F 3/12
(52) U.S. Cl. ........................................... 419/36; 419/38
(58) Field of Search ............................... 419/36, 27, 38

(56) References Cited

U.S. PATENT DOCUMENTS 4,554,218 A * 11/1985 Gardner et al. ............. 428/567
5,745,834 A     4/1998 Bampton et al. ............. 419/37
5,749,041 A *  5/1998 Lakshminarayan et al. .... 419/2

* cited by examiner

Primary Examiner—Daniel Jenkins
(74) Attorney, Agent, or Firm—Koppel & Jacobs (57) ABSTRACT

A method of strengthening green form parts made from metal powder requires the use of a cross-linkable polymer which, when cross-linking has been induced, retains its mechanical properties to a degree sufficient to prevent fracture or significant deformation of the green form part when subjected to heat sufficient to induce phase transformation and carbonization. The polymer is incorporated into a green form part and cross-linking induced, giving the green part additional strength which enables it to endure the consolidation process without failing. The required polymer can be part of the powder blend used to form the green form part, and induced to cross-link with heat or radiation. Alternatively, the green form part can be dipped in a thermoset resin that cross-links when cured.

34 Claims, 4 Drawing Sheets

STRENGTHENING METHOD FOR GREEN FORM PARTS MADE FROM METAL POWDER

BACKGROUND OF THE INVENTION

1. Field of the Invention

This invention relates to the field of metal part fabrication, and particularly to the fabrication of parts from metal powder.

2. Description of the Related Art

The use of a metal powder to manufacture metal parts is well-known. Typically, a metal powder and a lubricant are tightly compacted into a mold or a die, forming a "green form" part. Green form parts resemble the desired part, but lack density and strength. The fragile green form part is subjected to a heating step, which sinters the metal powder and causes the part to densify and consolidate.

U.S. Pat. No. 5,745,834 to Bampton et al. and assigned to the present assignee ("the '834 patent") describes a "free form" fabrication method, in which a green form part is built up layer-by-layer by localized laser melting of a powder blend that includes both metal and a polymer binder. The green form part then undergoes densification in the conventional manner.

A method used to fabricate metal parts having surface features only is described in co-pending patent application Ser. No. 09/404,227 (assigned to the present assignee). Here, a powder blend that includes both metal and a polymer binder is poured into a mold, which is heated to form the green form part. After removing the green part from the mold, it is placed in an oven to be consolidated.

The methods described above are capable of producing a wide variety of metal parts. However, one drawback common to all of these techniques is the limited size of the parts that can be made. Green form parts having thin walls or complex structures can lose their strength when subjected to the heat required for consolidation. This is due to the fact that the lubricant or polymer binder used in the powder blend tends to melt at the elevated consolidation temperature, becoming a low viscosity fluid that weakens the structure. The weakness can result in the structure failing during consolidation, particularly if it is large or has unsupported members extending from it.

SUMMARY OF THE INVENTION

A method of strengthening green form parts made from metal powder is presented, which enables the fabrication of larger powder-based parts than has heretofore been possible.

The novel method requires the use of a polymer which retains its mechanical properties to a degree sufficient to prevent fracture or significant deformation of the green form part when subjected to heat sufficient to induce phase transformation and, carbonization. Incorporating such a polymer into a green form part prior to densification gives it additional strength, which enables the part to endure the densification temperature without failing.

Cross-linkable polymers provide the mechanical properties described above, and as such are specified for use in the present method. Cross-linking is induced once the polymer is incorporated into the green part. The polymer may be incorporated into the green form part in a number of ways. For example, the cross-linkable polymer can be part of the powder blend used to form the green form part, and induced to cross-link when subjected to the heat of consolidation, or to a particular type of radiation. Another possibility requires the green form part to be dipped in a thermoset resin that cross-links when cured. Regardless of the method used to incorporate the cross-linkable polymer, once cross-linking has occurred, it retains more of its mechanical properties when subjected to the high heat of densification than it would otherwise. This lends strength to the structure and enables it to endure the consolidation process, thus overcoming the shortcomings of prior art fabrication methods.

Further features and advantages of the invention will be apparent to those skilled in the art from the following detailed description, taken together with the accompanying drawings.

DETAILED DESCRIPTION OF THE INVENTION

Figure 1:
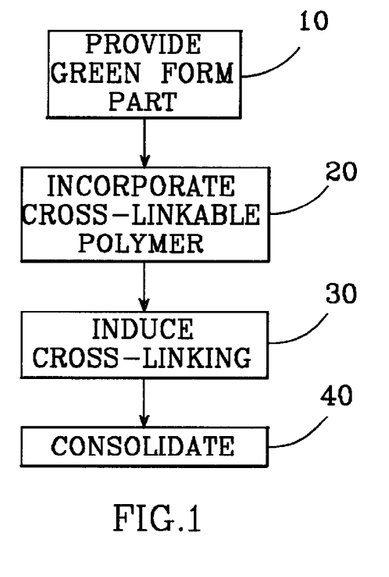
FIG. 1 is a flow chart of a strengthening method for green form parts made from metal powder.

A method of strengthening green form parts made from metal powder is illustrated in FIG. 1. The method is applicable to all green form parts, regardless of the method by which they were produced. Thus, green parts made by 1) conventional compaction, 2) the layer-by-layer direct fabrication method described in the '834 patent, 3) the surface-features only direct fabrication method described in co-pending patent application Ser. No. 09/404,227, 4) metal injection molding, or by other techniques, may benefit from the present strengthening method.

Larger, complex green form parts having thin walls or extended unsupported members are most likely to be weakened and possibly fail when subjected to the heat necessary to induce transient liquid sintering and isothermal resolidification, referred to herein as the "consolidation" step. The method, which is most beneficial when applied to larger green parts of this sort, begins by providing a powder-based green form part (step 10). To provide the additional strength necessary to come through the consolidation step intact, a cross-linkable polymer which retains its mechanical properties to a degree sufficient to prevent fracture or significant deformation of the green form part when subjected to heat sufficient to induce phase transformation and carbonization is incorporated into the green form part (step 20). This may be accomplished in several ways (each of which is discussed in more detail below), including blending an appropriate polymer in powder form with the metal powder, or dipping the green form part into an appropriate thermoset resin. Once the cross-linkable polymer is incorporated into the green form part, cross-linking within the polymer is induced (step 30). This can be brought about in several ways (each of which is discussed in more detail below), including heating or irradiating a green part that has a cross-linkable polymer mixed into its powder blend, or by allowing a green part dipped in a thermoset resin to cure.

Once cross-linking has occurred within the polymer, the green form part can undergo the consolidation step (step 40). Because the cross-linked polymer retains its mechanical properties to a degree sufficient to prevent fracture or significant deformation of the green form part when subjected to heat sufficient to induce phase transformation and carbonization, it provides strength to the green part that it would otherwise lose during the high heat of the consolidation step, thereby preventing the part from failing.

As polymers are heated, they undergo one or more phase transformations. Semi-crystalline polymers have both a "glass" transformation temperature ($T_g$) and a melting temperature ($T_m$), while amorphous polymers have only a $T_g$. As the temperature to which a polymer is subjected increases, it eventually becomes carbonized if the atmosphere is inert. Essential to the practice of the present strengthening method is a polymer that retains its mechanical properties to a degree sufficient to prevent fracture or significant deformation of the green form part when subjected to heat sufficient to induce phase transformation and carbonization. While other constituents of the green part may enter a liquid phase and thus weaken the part during the consolidation process, the required polymer largely bypasses the liquid or rubbery phase during its phase transformation/carbonization, thereby maintaining its mechanical properties and providing strength to the green part throughout consolidation.

When cross-linking occurs within a polymer, it tends to become stronger. Thus, a number of cross-linkable polymers provide the mechanical properties defined above once cross-linking has been induced, which can be accomplished in a number of ways. For example, some meltable monomers and meltable oligomers are transformed into cross-linked polymers when heated to a particular temperature. 1,1'-(Methylenedi-4,1-phenylene) bismaleimide, for example, is a meltable bismaleimide monomer that transforms into a cross-linked polymer when heated above its melting point (160° C.). Cross-linking can be induced in other polymers by exposing them to one or more forms of radiation, such as gamma ray, x-ray, or electron beam radiation. Polyolefine, for example, is a polymer that transforms into a cross-linked polymer when bombarded with gamma ray and x-rays.

A number of green form part fabrication processes involve the use of a (non-cross-linkable) polymer binder which aids in the formation of the green part. The liquification of this binder during consolidation can lead to the failure of larger green parts. When the present strengthening method is incorporated into such a fabrication process, the cross-linkable polymer used should be carefully selected so that it provides added strength to the structure before the non-cross-linkable binder enters its liquid phase. Thus, if the non-cross-linkable polymer binder has a melting temperature $T_m$, the cross-linkable polymer should initiate cross-linking at a temperature no greater than $T_m$, to insure that the part is strengthened before failure occurs.

Figure 2A:
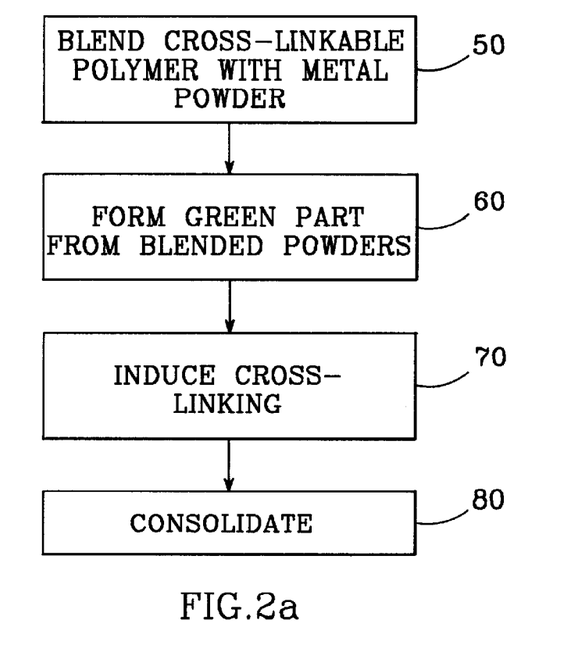
FIG. 2a is a flow chart of the present strengthening method in which the required cross-linkable polymer is blended with the metal powder.

There are two primary methods by which the required cross-linkable polymer can be incorporated into the green form part. The first method, illustrated in FIG. 2a, requires blending a powder form of the cross-linkable polymer with the other green part constituents (step 50) prior to forming the green part (step 60), and inducing cross-linking once the green part is formed (step 70). The green form part thus strengthened can then undergo consolidation (step 80). The average particle size of the cross-linkable polymer powder is preferably about 5 $\mu$m or less, and the particle shape is preferably spherical or near-spherical.

In some processes, one component of the powder blend is a thermoplastic polymer binder—for example, a crystalline polymer such as polyamide, acetal, polyester, polyolefin, or cellulose; in these instances, the cross-linkable polymer powder is preferably a thermoset powder binder which is solid until melting at or above the $T_m$ of the co-blended thermoplastic binder.

Figure 2B:
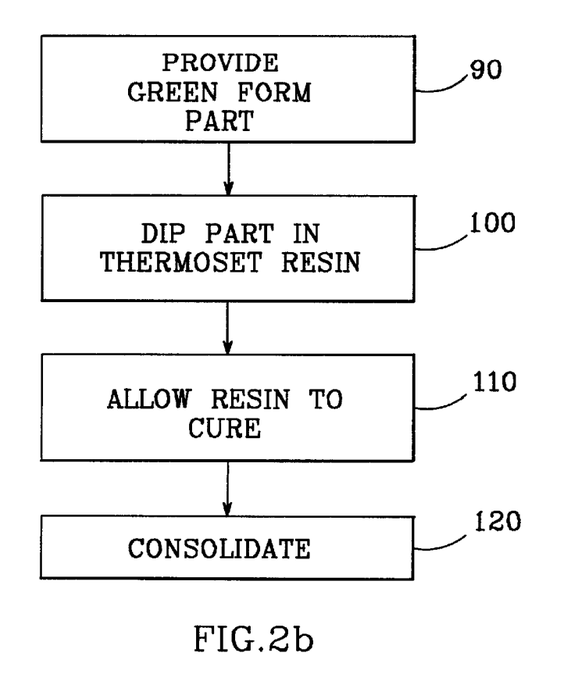
FIG. 2b is a flow chart of the present strengthening method in which the required cross-linkable polymer is incorporated into the green form part by dipping the part in a thermoset resin.

The second method is shown in FIG. 2b, in which a provided green form part (step 90) is dipped into a thermoset resin (step 100) and allowed to cure (step 110). The bound powders become impregnated with the resin, which cross-links as it cures. The strengthened green form part is then consolidated in step 120.

Potential crosslinkable materials include monomers, oligomers, and polymers terminated (or functionalized) with at least one of the reactive functional groups that are known to promote cross-linking, such as maleimide, nadimide, acetylene, cyanate ester, vinyl, diene, allyl, cyclobenzobutene, acrylic, and epoxy. If the crosslinkable material is a powder, it must initiate cross-linking upon melting and eventually form highly cross-linked networks having a high $T_g$ during heat treatment of the green part. The blend of the crosslinkable binder and metal powders is preferably recyclable, i.e., it should be possible to reuse the metal/binder blend repeatedly without affecting the quality of the resulting green parts.

Figure 3A:
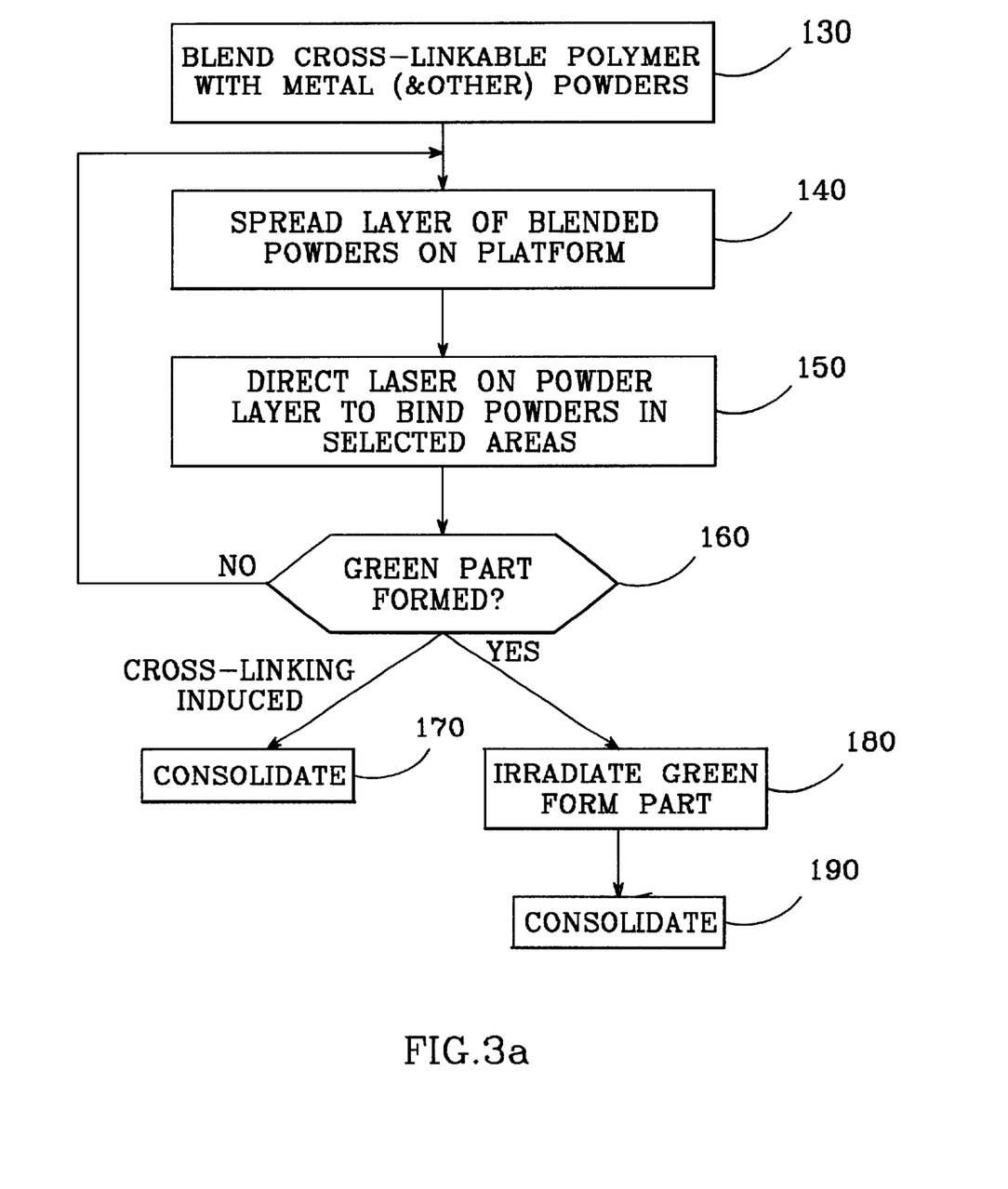
FIG. 3a is a flow chart of the present strengthening method as incorporated into a layer-by-layer direct metal fabrication process, in which the required cross-linkable polymer is blended with the metal powder.
Figure 3B:
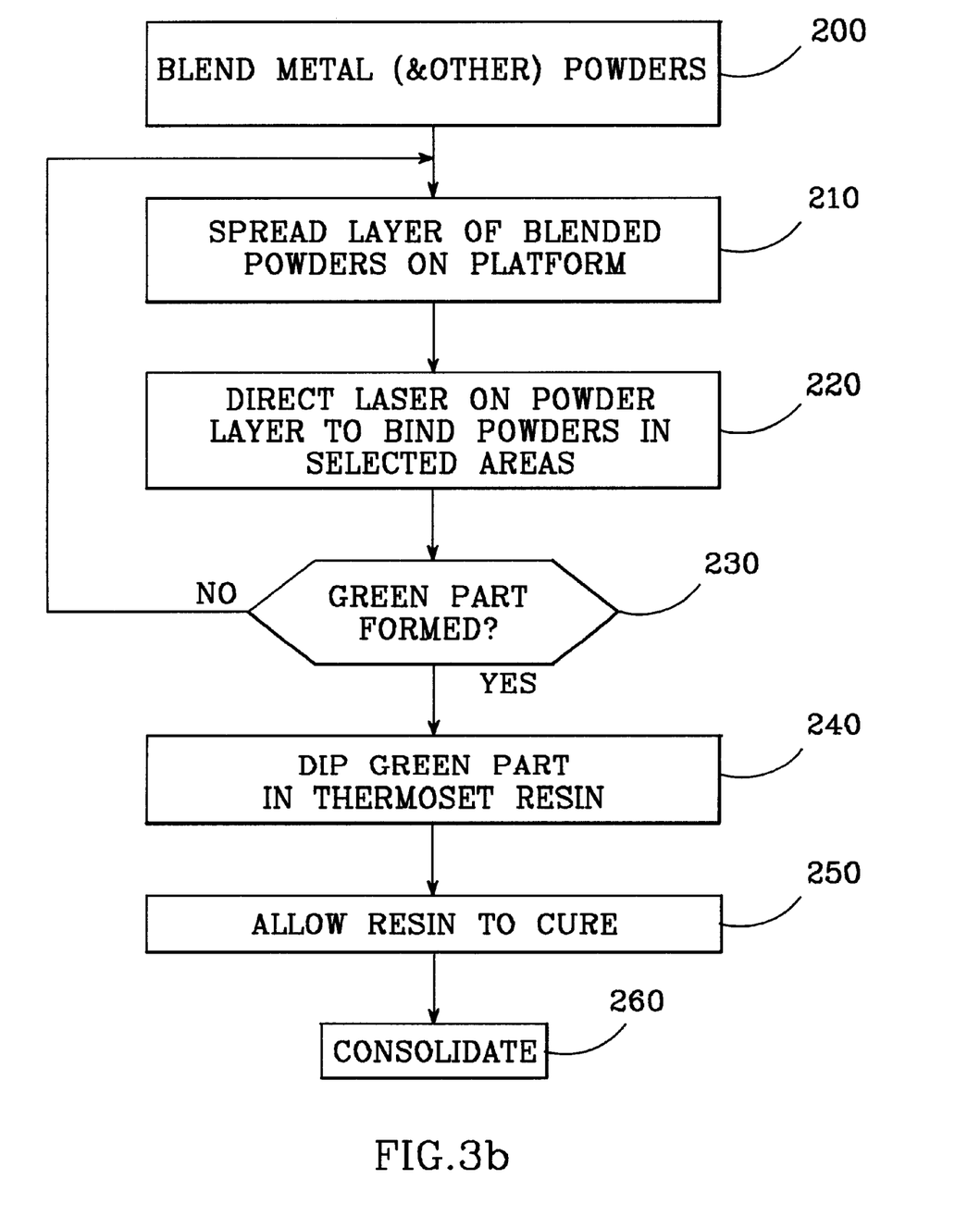
FIG. 3b is a flow chart of the present strengthening method as incorporated into a layer-by-layer direct metal fabrication process, in which the required cross-linkable polymer is incorporated into the green form part by dipping the part in a thermoset resin.

Flow charts depicting the use of the novel strengthening method with modified versions of the layer-by-layer direct metal fabrication method described in the '834 patent are shown in FIGS. 3a and 3b. In FIG. 3a, a cross-linkable polymer in powder form is blended with the other powders that will make up the green part (step 130). The other powders include a metal, and may also include one or more other polymer binders in addition to the cross-linkable polymer. A thin layer of the blended powders is spread on a platform (step 140), and a laser is directed onto the powder layer to bind the powders in selected areas (step 150). Steps 140 and 150 are repeated as necessary to build up a green form part (as determined by decision step 160). Depending on the characteristics of the cross-linkable polymer used, the formed green part may then be consolidated (step 170), with cross-linking induced by either the heat provided by the laser in step 150, or by the heat of consolidation in step 170. The green part may alternatively be irradiated (step 180) to induce cross-linking, followed by consolidation (step 190). The cross-linkable polymer and any polymer binders are decomposed during consolidation.

In FIG. 3b, a powder blend is prepared which does not include a cross-linkable polymer (step 200). The blend includes a metal, and may also include one or more other polymer binders. A thin layer of the blended powders is spread on a platform (step 210), and a laser is directed onto the powder layer to bind the powders in selected areas (step 220). Steps 210 and 220 are repeated as necessary to build up a green form part (as determined by decision step 230). Once the green part is formed, is dipped in a thermoset resin (step 240), and the resin allowed to cure (step 250). With the green part impregnated with the cured thermoset resin, it exhibits more strength than it would otherwise possess, and a consolidation step (step 260) can be safely performed. The cross-linkable polymer and any polymer binders are decomposed during consolidation.

Additional details on the layer-by-layer method of direct metal fabrication described herein are found in the '834 patent cited above. It should be noted that while the process in the '834 patent requires a powder blend that includes a base metal, an alloy of the base metal having a lower melting temperature, and a polymer binder, the present invention does not require the presence of a lower temperature alloy.

Figures 4A, 4B:
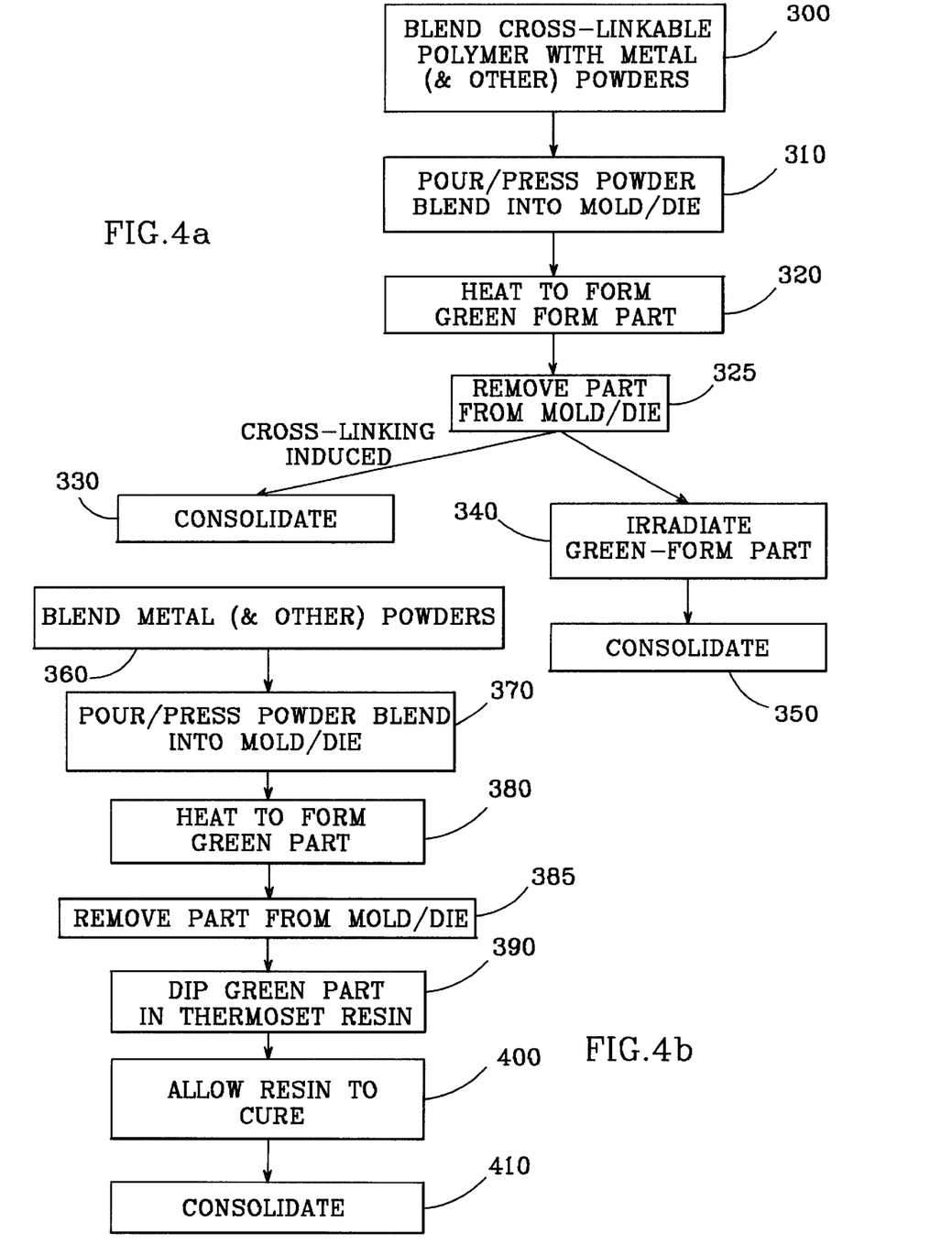
FIG. 4a is a flow chart of the present strengthening method as incorporated into a direct metal fabrication process for producing parts with surface features only, in which the required cross-linkable polymer is blended with the metal powder.
FIG. 4b is a flow chart of the present strengthening method as incorporated into a direct metal fabrication process for producing parts with surface features only, in which the required cross-linkable polymer is incorporated into the green form part by dipping the part in a thermoset resin.

Flow charts depicting the use of the novel strengthening method with modified versions of the surface-features-only direct metal fabrication method described in co-pending patent application Ser. No. 09/404,227 are shown in FIGS. 4a and 4b. In FIG. 4a, a cross-linkable polymer powder is blended with the other powders that will make up the green part (step 300). The other powders include a metal, and may also include one or more other polymer binders in addition to the cross-linkable polymer. When this is the case (as noted above), the cross-linkable polymer powder is preferably a thermoset powder binder and the other polymer binder is typically a thermoplastic binder; the thermoset binder must be solid until melting at or above the $T_m$ of the co-blended thermoplastic binder. The blended powders are poured or pressed into a part negative cavity such as a mold or die (step 310), which is heated to form a green part (step 320). When formed, the green form part is removed from the mold or die (step 325). Depending on the characteristics of the cross-linkable polymer used, the formed green part may then be consolidated (step 330), with cross-linking induced by the heat provided in steps 320 or 330. Alternatively, the green part may be irradiated (step 340) to induce cross-linking, followed by consolidation (step 350).

In FIG. 4b, a powder blend is prepared which does not include a cross-linkable polymer (step 360). The blend includes a metal, and may also include one or more polymer binders. The blended powders are poured or pressed into a part negative cavity such as a mold or die (step 370), which is heated to form a green part (step 380). Once the green part is formed, it is removed from the mold or die (step 385), dipped in a thermoset resin (step 390), and the resin allowed to cure (step 400). With the green part impregnated with the cured thermoset resin, it exhibits more strength than it would otherwise possess, and a consolidation step (step 410) can be safely performed.

Additional details on the surface-features-only method of direct metal fabrication described herein are found in the co-pending patent application (Ser. No. 09/404,227) cited above. It should be noted that while the process in the Ser. No. 09/404,227 application requires that an alloy having a lower melting temperature be blended with the base metal powder and a polymer binder, the present invention does not require the presence of a lower temperature alloy.

DESCRIPTION OF PREFERRED EMBODIMENTS

Thermoset Resin Dipping of Metal Green Parts

EXAMPLE 1

Mild-steel green parts (1 inch wide, 0.5 inch thick, 5 inch long) containing 3% nylon 12 binder was laser sintered using a DTM Sinterstation 2500 from DTM Corp. in Austin, Tx. The following five bar samples were prepared to determine the binder performance during heat treatment:

Sample A: No additional binder.

Sample B: Dipped into a solution of TACTIX 742 (Ciba Specialty Chemicals)/EMI 24/methyl ethyl ketone (5 gm/0.2 gm/100 ml) for 3 minutes and then air dried overnight. The weight percent of the second binder was 0.5%.

Sample C: Dipped into a solution of phenolic resin (with 8.6% hexamethylenetetramine, from Elf Atochem)/methanol (5 gm/100 ml) for 3 minutes and then air dried overnight. The weight percent of the second binder was 0.85%.

Sample D: Dipped into a solution of ULTEM polyetherimide (General Electric)/methylene chloride (9 gm/100 ml) for 3 minutes and then air dried overnight. The weight percent of the second binder was 1.2%.

Sample E: Dipped into a solution of MATRIMIDE 5218 polyimide (Ciba Specialty Chemicals)/methylene chloride (8 gm/100 ml) for 3 minutes and then air dried overnight. The weight percentage of the second binder was 1.2%.

The test bars were heated in a furnace to 800° C. at 3° C./min in nitrogen while holding one end horizontally. The test results are described below:

Sample A fractured to form two pieces.

Sample B showed no sign of deformation or cracks.

Sample C fractured to form two pieces, probably due to insufficient cross-linking of the binder, resulting in softening when heated above its Tg.

Samples D and E: these thermoplastic polyimides showed no cracks, though were slightly deformed above their respective Tg values (260° C. and 370° C., respectively).

EXAMPLE 2

TACTIX 742 epoxy resin (50 gm) was first dissolved in methyl ethyl ketone (1000 ml). EMI 24 imidazole catalyst (2 gm, Air Products) was added to the solution, and stirred to obtain a homogeneous solution. A mild steel green part containing 3% nylon 12 binder was fabricated using a DTM Sinterstation 2500. The metal green part was subsequently dipped into the epoxy solution for 3 minutes and air dried overnight. The dipped green part containing ca. 0.5% epoxy was then placed into a furnace and heated to 800° C. at a rate of 3° C./min in nitrogen. The part maintained good mechanical properties during the heat treatment and generated no cracks or deformation. The recovered epoxy solution, if kept in a refrigerator, was reusable even 3 weeks later (until the formation of white precipitates was observed).

EXAMPLE 3

To a solution of TACTIX 742 (50 gm) and methyl ethyl ketone (1000 ml), 1-phenylimidazole (2 gm, Air Products) was added and stirred to form a homogeneous solution. A green part based on mild steel and containing 3% nylon 12 binder fabricated using a DTM Sinterstation 2500 was dipped in the above solution for 3 minutes and air dried overnight. The dried green part containing ca. 0.5% epoxy resin was subsequently placed in a furnace and heated to 800° C. at a rate of 3° C./min in nitrogen. The part maintained good mechanical properties during the heat treatment and generated no cracks or deformation. The recovered epoxy solution, if kept in a refrigerator, was reusable even 3 weeks later.

Thermoset Powder Binder System

EXAMPLE 4

N,N'-1,3-Phenylenedimaleimide having a melting point of 200° C. and an average particle size of 5 $\mu$m (50 gm) was blended with nylon 12 powders having an average particle size of 5 $\mu$m (50 gm) and stainless steel particles having an average particle size of 15 $\mu$m (1570 gm). The resulting powder blend was used to fabricate a green part using a DTM Sinterstation 2500. The metal part was subsequently heat treated to 800° C. at 1° C./min. in nitrogen. The part maintained good mechanical properties during the heat treatment, overcoming the problem associated with parts containing only nylon 12 binder. The powder mixture exhibited good recyclability and was repeatedly reused without adversely affecting the quality of the green parts or the powder properties. Various nylon 12/N,N'-1,3-Phenylenedimaleimide ratios were tested, including 6:1, 3:1, 3:2, and 1:1. Mechanical properties at temperature improved with increasing N,N'-1,3-Phenylenedimaleimide. Bending modulus was measured in excess of 1 GPa throughout the heat treatment of the 1:1 blend. No fracture of any sample was observed. In situ strength is inferior to parts treated with the dipping resin. However, strength seems sufficient to inhibit cracking of any conceivable SLS green part until the initiation of solid-state, liquid-phase, or supersolidus liquid phase sintering begins. The strength loss is offset by the elimination of the extra dipping process step.

The green form part fabrication methods described above are merely examples of methods with which the novel strengthening method can be used. As noted above, green form parts made by any known method may benefit from the present method.

While particular embodiments of the invention have been shown and described, numerous variations and alternate embodiments will occur to those skilled in the art. Accordingly, it is intended that the invention be limited only in terms of the appended claims.

We claim:

1. A method of strengthening green form parts made from metal powder, comprising the steps of:
   preparing a powder blend comprising:
   a metal powder,
   a cross-linkable polymer in powder form,
   a second polymer binder in powder form, wherein said second polymer binder is a semi-crystalline thermoplastic polymer having a melting temperature $T_m$ and said cross-linkable polymer is a thermoset binder having a melting temperature about equal to or greater than $T_m$ which initiates cross-linking at a temperature no greater than $T_m$;
   blending said metal powder with said cross-linkable polymer powder and said second polymer binder powder;
   compacting said blended powders into a green form part;
   heating said green form part to a temperature sufficient to induce cross-linking in said cross-linkable polymer; and
   heating said green form part to a temperature sufficient to induce transient liquid sintering and isothermal resolidification to densify said part, the retained mechanical properties of said cross-linked polymer providing additional strength to said metal part throughout said densification.

2. A method of strengthening green form parts made from metal powder, comprising the steps of:
   providing a green form part comprising compacted metal powder;
   providing a thermoset resin;
   dipping said green form part in said thermoset resin and an organic solvent having a low boiling point;
   allowing said resin to cure; and
   heating said green form part to a temperature sufficient to induce transient liquid sintering and isothermal resolidification to densify said part, the retained mechanical properties of said cross-linked polymer providing additional strength to said metal part throughout said densification.

3. The method of claim 2, wherein said organic solvent is selected from the group consisting of acetone, methyl ethyl ketone, and alcohols.

4. A method of directly fabricating metal parts, comprising the steps of:
   preparing a powder blend comprising:
   a base metal,
   a first polymer binder, and
   a cross-linkable polymer, wherein said first polymer binder is a semi-crystalline thermoplastic polymer having a melting temperature $T_m$ and said cross-linkable polymer is a thermoset binder having a melting temperature about equal to or greater than $T_m$ which initiates cross-linking at a temperature no greater than $T_m$;
   spreading a layer of said powder blend on a platform;
   directing a beam of energy onto selected areas of said layer of said powder blend to melt said first polymer binder, said first polymer binder resolidifying to bind said metal powders in said selected areas;
   heating said bound metal powders to a temperature sufficient to induce cross-linking in said cross-linkable polymer; and
   heating said selected areas of bound metal powders to decompose said first polymer binder and said cross-linkable polymer and to densify said selected areas by transient liquid sintering and isothermal resolidification, the retained mechanical properties of said cross-linked polymer providing additional strength to said metal part throughout said densification step.

5. A method of directly fabricating metal parts, comprising the steps of:
   preparing a powder blend comprising:
   a base metal, and
   a first polymer binder;
   spreading a layer of said powder blend on a platform;
   directing a beam of energy onto selected areas of said layer of said powder blend to melt said first polymer binder, said first polymer binder resolidifying to bind said metal powders in said selected areas;
   providing a thermoset resin;
   dipping said bound metal powders in said thermoset resin and an organic solvent having a low boiling point;
   allowing said resin to cure; and
   heating said selected areas of bound metal powders to decompose said first polymer binder and said cross-linkable polymer and to densify said selected areas by transient liquid sintering and isothermal resolidification, the retained mechanical properties of said cross-linked polymer providing additional strength to said metal part throughout said densification step.

6. The method of claim 5, wherein said organic solvent is selected from the group consisting of acetone, methyl ethyl ketone, and alcohols.

7. A method of directly fabricating metal parts having surface features only, comprising the steps of:
   providing a part negative cavity of a metal part to be fabricated, said metal part having surface features only;
   pouring or pressing a powder blend into said part negative cavity, said powder blend comprising:
      a base metal,
      a first polymer binder, and
      a cross-linkable polymer, wherein said first polymer binder is a semi-crystalline thermoplastic polymer having a melting temperature $T_m$ and said cross-linkable polymer is a thermoset binder having a melting temperature about equal to or greater than $T_m$ which initiates cross-linking at a temperature no greater than $T_m$;
   heating said part negative cavity until said first polymer binder melts and adheres the metal particles to form a green form part;
   removing said green form part from said part negative cavity;
   heating said green form part to a temperature sufficient to induce cross-linking in said cross-linkable polymer;
   heating said green form part to decompose said binder and consolidate said part via transient liquid phase sintering, the retained mechanical properties of said cross-linked polymer providing additional strength to said metal part throughout said consolidation step.

8. A method of directly fabricating metal parts having surface features only, comprising the steps of:
   providing a part negative cavity of a metal part to be fabricated, said metal part having surface features only;
   pouring or pressing a powder blend into said part negative cavity, said powder blend comprising:
      a base metal, and
      a polymer binder;
   heating said part negative cavity until said polymer binder melts and adheres the metal particles to form a green form part;
   removing said green form part from said part negative cavity;
   providing a thermoset resin;
   dipping said green form part in said thermoset resin and an organic solvent having a low boiling point;
   allowing said resin to cure; and
   heating said green part to decompose said binder and consolidate said part via transient liquid phase sintering, the retained mechanical properties of said cross-linked polymer providing additional strength to said metal part throughout said consolidation step.

9. The method of claim 8, wherein said organic solvent is selected from the group consisting of acetone, methyl ethyl ketone, and alcohols.

10. A method of strengthening green form parts made from metal powder, comprising the steps of:
   preparing a powder blend comprising:
      a base metal, and
      a cross-linkable polymer;
   compacting said blended powders into a green form part;
   irradiating said green form part with radiation sufficient to induce cross-linking in said cross-linkable polymer; and
   heating said green form part with said incorporated cross-linkable polymer to a temperature sufficient to induce transient liquid sintering and isothermal resolidification to densify said part, the retained mechanical properties of said cross-linked polymer providing additional strength to said metal part throughout said densification.

11. A method of directly fabricating metal parts, comprising the steps of:
   preparing a powder blend comprising:
      a base metal, and
      a first polymer binder;
   spreading a layer of said powder blend on a platform;
   directing a beam of energy onto selected areas of said layer of said powder blend to melt said first polymer binder, said first polymer binder resolidifying to bind said metal powders in said selected areas;
   incorporating a cross-linkable polymer into said bound metal powders which, when cross-linking has been induced in said cross-linkable polymer, retains its mechanical properties to a degree sufficient to prevent fracture or significant deformation of said bound metal powders when subjected to heat sufficient to induce phase transformation and carbonization;
   irradiating said bound metal powders with radiation sufficient to induce cross-linking in said cross-linkable polymer; and
   heating said selected areas of bound metal powders to decompose said first polymer binder and said cross-linkable polymer and to densify said selected areas by transient liquid sintering and isothermal resolidification, the retained mechanical properties of said cross-linked polymer providing additional strength to said metal part throughout said densification step.

12. A method of directly fabricating metal parts having surface features only, comprising the steps of:
   providing a part negative cavity of a metal part to be fabricated, said metal part having surface features only;
   pouring or pressing a powder blend into said part negative cavity, said powder blend comprising:
      a base metal, and
      a polymer binder;
   heating said part negative cavity until said polymer binder melts and adheres the metal particles to form a green form part;
   removing said green form part from said part negative cavity;
   incorporating a cross-linkable polymer into said green form part which, when cross-linking has been induced in said cross-linkable polymer, retains its mechanical properties to a degree sufficient to prevent fracture or significant deformation of said green form part when subjected to heat sufficient to induce phase transformation and carbonization;
   irradiating said green form part with radiation sufficient to induce cross-linking in said cross-linkable polymer; and
   heating said green part to decompose said binder and consolidate said part via transient liquid phase sintering, the retained mechanical properties of said cross-linked polymer providing additional strength to said metal part throughout said consolidation step.

13. The method of claim 1, wherein said cross-linkable polymer and said semi-crystalline thermoplastic polymer comprise fine particles having an average diameter of about 5 µm or less.

14. The method of claim 1, wherein said cross-linkable polymer is a meltable monomer, oligomer, or polymer terminated or functionalized with at least one reactive functional group known to promote cross-linking.

15. The method of claim 14, wherein said cross-linkable polymer is selected from the group consisting of maleimide, nadimide, acetylene, cyanate ester, vinyl, diene, allyl, cyclobenzobutene, acrylic, and epoxy.

16. The method of claim 1, wherein said cross-linkable polymer is a meltable monomer, oligomer, or polymer terminated or functionalized with at least one reactive functional group known to promote cross-linking.

17. The method of claim 16, wherein said crystalline polymer is selected from the group consisting of polyamide, acetal, polyester, polyolefin, and cellulose and said cross-linkable polymer is selected from the group consisting of maleimide, nadimide, acetylene, cyanate ester, vinyl, diene, allyl, cyclobenzobutene, acrylic, and epoxy.

18. The method of claim 10, wherein said radiation is gamma ray radiation.

19. The method of claim 10, wherein said radiation is electron beam radiation.

20. The method of claim 10, wherein said radiation is x-ray radiation.

21. The method of claim 10, wherein said cross-linkable polymer is a semi-crystalline thermoplastic selected from the group consisting of polyamide, acetal, polyester, polyolefin, and cellulose.

22. The method of claim 2, wherein said thermoset resin is a monomer, oligomer, or polymer terminated or functionalized with at least one reactive functional group known to promote cross-linking.

23. The method of claim 22, wherein said thermoset resin is selected from the group consisting of maleimide, nadimide, acetylene, cyanate ester, vinyl, diene, allyl, cyclobenzobutene, acrylic, and epoxy.

24. The method of claim 4, wherein said cross-linkable polymer and said semi-crystalline thermoplastic polymer comprise fine particles having an average diameter of about 5 $\mu$m or less.

25. The method of claim 24, wherein said fine particles are approximately spherical.

26. The method of claim 4, wherein said cross-linkable polymer is a meltable monomer, oligomer, or polymer terminated or functionalized with at least one reactive functional group known to promote cross-linking.

27. The method of claim 26, wherein said crystalline polymer is selected from the group consisting of polyamide, acetal, polyester, polyolefin, and cellulose and said cross-linkable polymer is selected from the group consisting of maleimide, nadimide, acetylene, cyanate ester, vinyl, diene, allyl, cyclobenzobutene, acrylic, and epoxy.

28. The method of claim 4, wherein said cross-linkable linkable polymer is a meltable monomer having a melting point about equal to or greater than $T_m$ which transforms into a cross-linked polymer at a temperature no greater than $T_m$.

29. The method of claim 4, wherein said cross-linkable polymer is a meltable oligomer having a melting point about equal to or greater than $T_m$ which transforms into a cross-linked polymer at a temperature no greater than $T_m$.

30. The method of claim 4, further comprising the step of repeating said steps of spreading said powder blend and directing said energy beam onto selected areas layer-by-layer to build up a green form part of bound powders.

31. The method of claim 30, wherein said heating step comprises heating said preform part to decompose said first polymer binder and said cross-linkable polymer and to densify said green form part.

32. The method of claim 5, wherein said thermoset resin is a monomer, oligomer, or polymer terminated or functionalized with at least one reactive functional group known to promote cross-linking.

33. The method of claim 32, wherein said thermoset resin is selected from the group consisting of maleimide, nadimide, acetylene, cyanate ester, vinyl, diene, allyl, cyclobenzobutene, acrylic, and epoxy.

34. The method of claim 5, wherein said thermoset resin cures with negligible flow such that said resin is uniformly distributed on said bound powders.

* * * * *